(12) United States Patent
Li et al.

(10) Patent No.: US 6,884,848 B2
(45) Date of Patent: Apr. 26, 2005

(54) BENZOCYCLOBUTENONE-FUNCTIONAL FLUOROPOLYMERS

(75) Inventors: Kai Li, Diamond Bar, CA (US); Yukihiko Sasaki, Claremont, CA (US); Prakash Mallya, Sierra Madre, CA (US); Pradeep Iyer, Hacienda Heights, CA (US)

(73) Assignee: Avery Dennison Corporation, Pasadena, CA (US)

( * ) Notice: Subject to any disclaimer, the term of this patent is extended or adjusted under 35 U.S.C. 154(b) by 248 days.

(21) Appl. No.: 10/243,599

(22) Filed: Sep. 13, 2002

(65) Prior Publication Data

US 2003/0114551 A1 Jun. 19, 2003

Related U.S. Application Data

(62) Division of application No. 09/547,486, filed on Apr. 12, 2000, now Pat. No. 6,565,968.

(51) Int. Cl.$^7$ .................. C08L 27/12; C08F 216/12; C07C 49/115
(52) U.S. Cl. ............... 525/200; 525/199; 525/326.2; 525/326.3; 526/247; 526/245; 526/246; 568/327
(58) Field of Search ............... 525/200, 199, 525/326.2, 326.3; 526/247, 245, 246, 266; 568/327

(56) References Cited

U.S. PATENT DOCUMENTS

| | | |
|---|---|---|
| 4,661,193 A | 4/1987 | Kirchhoff et al. |
| 5,164,444 A | 11/1992 | Bernard |
| 5,294,688 A | 3/1994 | Rehmer et al. |
| 5,563,205 A | 10/1996 | Mayer et al. |
| 5,686,504 A | 11/1997 | Ang |
| 5,869,693 A | 2/1999 | Wang |
| 6,040,465 A | 3/2000 | Miyano et al. |

FOREIGN PATENT DOCUMENTS

WO    WO 97/11996    4/1997

OTHER PUBLICATIONS

Shell Chemical Company; Research Product Data Sheet No. 120895–01; KRATON Liquid™ Polymer Research Product HPVM–1251; Dec. 20, 1995; pp. 1–2.

Scicchitano, et al.; Die Angewandte Makromolekulare Chemie 231; Synthesis and characterization of low–viscosity fluoropolyether–based segmented oligomers; 1995; pp. 47–60.

Kuang, et al.; Carleton University, Ottawa, Canada, 82$^{nd}$ CSC Conference; May 29$^{th}$–Jul. 2$^{nd}$; Functionalization of Polymer Surface Using the Chemistry of Benzocyclobutenone; 1999; pp. 1–19.

D. Satas; Handbook of Pressure Sensitive Adhesive Technology, Second Edition; Copyright ©1989 by Van Nostrand Reinhold; Library of Congress Catalog Card Number 88–21107; pp. 444–451.

Wang et al.; Macromolecules; New Route to Incorporation of [60] Fullerene into Polymers via the Benzocyclobutenone Group; vol. 31, No. 16, pp. 5556–5558.

Suzzarini et al.; Tetrahedron Letters; Improved Synthesis of Benzocyclobutenone by Flash Vacuum Pyrolysis; vol. 39 (1998); pp. 1695–1696.

Wang et al.; Tetrahedron Letters; Thermal Reactions of Benzocyclobutenone With Alcohols; vol. 38; No. 33 (1997); pp. 5745–5746.

*Primary Examiner*—James J. Seidleck
*Assistant Examiner*—Olga Asinovsky
(74) *Attorney, Agent, or Firm*—Christie, Parker & Hale, LLP

(57) ABSTRACT

Fluoropolymers containing the benzocyclobutenone moiety are provided.

13 Claims, No Drawings

BENZOCYCLOBUTENONE-FUNCTIONAL FLUOROPOLYMERS

CROSS-REFERENCE TO RELATED APPLICATIONS

This application is a divisional of U.S. application Ser. No. 09/547,486 (now U.S. Pat. No. 6,565,968) entitled "UV-Curable Pressure-Sensitive Adhesives and Protective Coatings," filed Apr. 12, 2000, the entire contents of which is incorporated herein by reference. A related Divisional Application, Ser. No. 10/243,155 (now U.S. Pat. No. 6,593,490) entitled "Benzocyclobutenone-Containing Monomers," was filed on Sep. 13, 2002.

FIELD OF THE INVENTION

The present invention provides pressure-sensitive adhesives (PSAs) and protective coatings based on one or more polymers containing a moiety like benzocyclobutenone (BCBO) that is capable of generating a ketene under UV irradiation.

BACKGROUND OF THE INVENTION

PSAs are a distinct category of adhesives which, in dry (solvent-free) form, are aggressively and permanently tacky at room temperature and firmly adhere to a variety of dissimilar substrates upon mere contact, without need of more than finger or hand pressure. PSAs do not require activation by water, heat, or solvents; and have sufficient cohesive strength to be handled with the fingers. The primary mode of bonding for a PSA is not chemical or mechanical but, rather, a polar attraction to the substrate, and always requires initial pressure to achieve sufficient wet-out onto the surface to provide adequate adhesion.

Both rubber-based and acrylic-based PSAs are known. In 1966, C. Dalquist identified a one-second creep compliance greater than $1 \times 10^{-6}$ cm$^2$/dyne as the efficient contact criterion for a good PSA. A more recent discussion of PSAs in the *Handbook of Pressure Sensitive Adhesive Technology* (2d Edition), D. Satas, ed. (1989), (hereafter, "*Handbook*"), pages 172–176, incorporated by reference herein, identifies glass transition temperature ($T_g$) and modulus (G') at the application (use) temperature as the most important requirements for PSA performance. Both properties are a function of the identities and amounts of monomers that comprise the PSA polymer(s). Thus, poly(acrylic acid) is not a PSA, but a copolymer of acrylic acid and a high mole % of 2-ethylhexyl acrylate is.

The typical values of G' and $T_g$ for label and tape PSAs are described in the *Handbook*. For a tape, G' at room temperature $\approx 5 \times 10^5$ to $2 \times 10^6$ dyne/cm$^2$, and $T_g \approx -15°$ C. to 10° C.; while labels have a lower value of G' at room temperature, i.e., about $2 \times 10^5$ to $8 \times 10^5$ dyne/cm$^2$. $T_g$ requirements for cold temperature, permanent, and removable applications are different, as is known in the art. Thus, cold temperature label PSAs generally require a $T_g$ of from about –30° C. to –10° C.

High performance PSAs are normally characterized by the ability to withstand creep or shear deformation at high loadings and/or high temperatures, while exhibiting adequate tack and peel adhesion properties. A high molecular weight provides the necessary cohesive strength and resistance to shear deformation, while a low modulus allows the polymer to conform to a substrate surface upon contact.

High molecular weight, or the physical effect of a high molecular weight, can be obtained by primary polymerization of monomers to form a backbone of long chain length, and/or by creating a high degree of inter chain hydrogen bonding, ionic association, or crosslinking between polymer chains. For solvent-based adhesives, it is preferred to crosslink after polymerization (so-called "post-polymerization crosslinking), which avoids processing difficulties such as coating a highly viscous polymer network. Post-crosslinking is also commonly used for water-based PSAs to enhance cohesive strength. Post-curing is also sometimes used with hot melt PSAs, although radiation curing is more commonly employed with such systems, to avoid thermal cure during the coating process.

Thermal crosslinking and photoinitiated crosslinking are well-known approaches to introducing crosslinks between polymer chains. In most photoinitiated (photocuring) systems, a post-added photoinitiator is employed and reacts with an acrylate, methacrylate, allyl, epoxy, or other functional group on the polymer or oligomer to be cured. Ultraviolet (UV) radiation causes curing. In such systems, a photoinitiator residue remains, and can have a deleterious effect. For example, in medical applications, such residues can cause skin irritation. In electronics applications, the residues can introduce undesirable contamination to the coated device. In addition, the curing process used in post-added photoinitiator systems is usually oxygen-sensitive. There is a need for high performance PSAs that have a good balance of tack, peel and shear strength, and that do not suffer from the drawbacks of photoinitiator residues and incomplete curing due to the presence of oxygen.

Another area where improved polymeric compositions are needed is protective coatings. These coatings include marine coatings, coatings for automotive components, scratch-resistant and dust-resistant coatings, top coats for printed or imprintable materials, and other coatings that provide a substrate with a protective barrier. For some applications, processing constraints limit the types of coatings that will work. For example, many electronic components are damaged by high temperatures and are thus unsuitable for protection with thermally cured coatings, unlike automotive finish applications. UV-curable coatings are the preferred choice for electronic components. However, electronic components are also sensitive to contaminants, particularly if the contaminants can cause a build-up in static charge or a change in the magnetic properties of the component. A need exists for improved protective coatings for electronic components.

Polymeric protective coatings having a low surface energy and chemical inertness are also desired in a variety of applications. Low surface energy materials are important for applications requiring reduced wetting and adhesion to other compounds; for instance, they can be used as coatings for supressing marine bioadhesion, for membranes with reduced biofouling, and as protective implants. Typically, such coatings have a surface energy of 16–25 dyne/cm. Fluropolymeric coatings are representative. An inherent drawback of such low surface energy, fluropolymeric coatings is poor adhesion to some substrates, such as ABS. This can lead to premature deprotection of the surface. On the other hand, acrylic polymers or resins have been widely used as coatings for many applications due to their good adhesion properties, UV stability, and optical clarity, etc. However, the higher surface energy (>33 dyne/cm) of acrylic polymers excludes them from many of the above-mentioned applications. Although in recent years, efforts have been made in the synthesis of fluorinated acrylic coatings through copolymerization, surface grafting, and polymer blend techniques, the use of acrylic polymers with fluropolymer blocks for coatings has not received much attention. A need exists for improved acrylic-fluropolymeric hybrids useful in a variety of coating applications.

SUMMARY OF THE INVENTION

According to one aspect of the present invention, high performance PSAs having a balance of tack, peel and shear strength are provided, and comprise at least one copolymer formed of a plurality of monomers that includes at least one ketene-forming monomer, e.g., benzocyclobutenone (BCBO), with the identity and amount of the monomers being selected such that the resulting copolymer is a PSA. One such PSA is formed by curing a polymer formed from a plurality of monomers that includes at least one ketene-forming monomer and at least two acrylic monomers, or at least one each of a ketene-forming monomer, an acrylic monomer, and a non-acrylic monomer. In another embodiment, the plurality of monomers includes at least one ketene-forming and at least one hydroxy-functional monomer or another monomer capable of crosslinking with a ketene moiety in response to elevated temperature or UV or EB radiation. Another PSA is formed by curing a mixture of two or more polymers, at least one of which is formed from a plurality of monomers that includes at least one ketene-forming monomer, and at least one other polymer is formed from a second plurality of monomers. In some embodiments, the first and/or second plurality of monomers includes at least one hydroxy-functional monomer, while in other embodiments one or more other reactive monomers are included. When the mixture of polymers is heated or irradiated with UV or EB radiation, it cures to a PSA having a high cohesive strength.

Other PSAs comprising polymers formed from BCBO and other monomers are also provided.

In another aspect of the invention, polymeric compositions that function as protective coatings are provided, and comprise at least one copolymer formed of a plurality of monomers that includes at least one BCBO or other ketene-forming monomer. The compositions are UV-curable and suitable for use as protective coatings for electronic components and in a variety of other applications.

Unlike conventional UV-curable systems, the new PSAs and protective coatings contain no photoinitiator residues after curing.

DETAILED DESCRIPTION

According to one embodiment of the invention, a PSA is provided and comprises at least one copolymer formed of a plurality of monomers that includes at least one "ketene-forming monomer", i.e., a monomer capable of forming a "ketene" (R=C=O) when heated above room temperature or irradiated with ultraviolet (UV) light or electron beam (EB) radiation. After being cured with heat or radiation, the copolymer has a high cohesive strength and is useful in a variety of tape, label, and other applications.

A particularly preferred class of ketene-forming monomers is referred to herein as benzocyclobutenone (BCBO) monomers. When exposed to heat or UV or EB radiation, BCBO undergoes a rearrangement and forms a ketene (R=C=O), which is highly reactive towards alcohols, as shown in Scheme 1:

Scheme 1

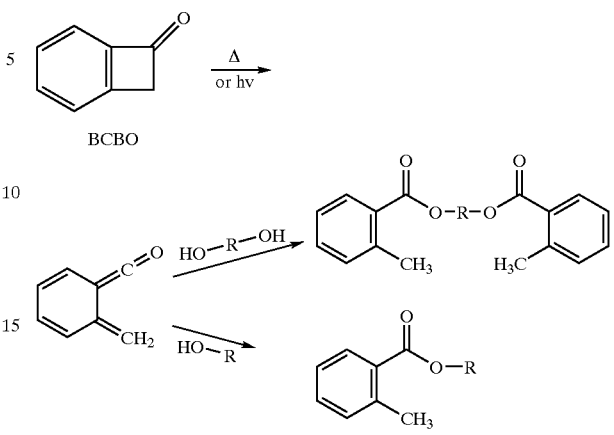

It has now been discovered that high cohesive strength PSAs can be prepared by first copolymerizing one or more BCBO or other ketene-forming monomers with a plurality of acrylic and/or non-acrylic monomers, preferably using conventional free-radical polymerization, and then curing the copoymer with UV or EB radiation and/or heat.

As used herein, the term "BCBO monomer" refers to any copolymerizable monomer containing the BCBO moiety, i.e., any BCBO-containing monomer that is capable of undergoing free-radical polymerization with other free-radical polymerizable monomers. Non-limiting examples include BCBO acrylate, BCBO methacrylate, and BCBO acrylamide, the structures of which are provided below:

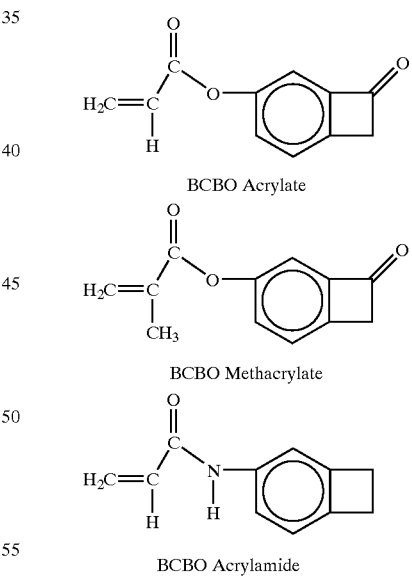

More generally, BCBO monomers have a formula

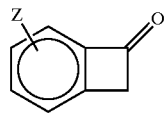

where Z is a functional group or moiety capable of copolymerizing with one or more ethylenically unsaturated monomers. For example, Z can be a vinyl group (H$_2$C=CH—), acrylic group (H$_2$C=CHC(O)O—), methacrylic group (H$_2$C=C(CH$_3$)C(O)O—), etc. Z can be bound directly to the BCBO moiety, or spaced apart therefrom by, e.g., a group such as an alkylene (—CH$_2$—)$_n$.

BCBO acrylamide ("BCBO-AM")can be prepared according to the method disclosed in U.S. Pat. No. 5,869,693, the contents of which are incorporated herein by reference. The same patent discloses the preparation of 5-hydroxy BCBO. BCBO acrylate and BCBO methacrylate can be prepared by reacting 5-hydroxy BCBO with acryloyl chloride or methacryloyl chloride, respectively. Reaction conditions are presented infra.

The term "acrylic monomer" refers to any monomer in the class of free-radical polymerizable monomers that includes acrylic acid, methacrylic acid, acrylamide, methacrylamide, acrylonitrile, and derivatives thereof. Non-limiting examples include alkyl (meth)acrylates, hydroxyalkyl (meth)acrylates, alkyl (meth)acrylamides, alkyl di(meth) acrylates, ethylenically unsaturated carboxylic acids, epoxy (meth)acrylates (e.g., glycidyl (meth)acrylate), ethoxylated (meth)acrylates, cyanoacrylates, etc. Also included are acrylic-, (meth)acrylamido-, and (meth)acrylonitrile-terminated macromers.

Alkyl (meth)acrylates are well known and commonly used in the preparation of acrylic PSAs. Nonlimiting examples include methyl, ethyl, propyl, butyl, pentyl, hexyl, octyl, nonyl, decyl, undecyl, and dodecyl acrylate, and the corresponding methacrylates, cyclic acrylates and methacrylates, e.g., cyclohexyl acrylate, isobornyl acrylate, are also included. (Meth)acrylates with 4–12 carbon atoms per alkyl group are considered "soft" monomers, and form copolymers with lower Tg's than so-called "hard" monomers, e.g., methyl (meth)acrylate, ethyl methacrylate, etc.

Non-limiting examples of hydroxyalkyl (meth)acrylates include hydroxyethyl acrylate (HEA), hydroxyethyl methacrylate (HEMA), and hydroxypropyl acrylate.

Nonlimiting examples of alkyl (meth)acrylamides include acrylamide, methacrylamide, N-methylol (meth)acrylamide, N-ethanol acrylamide, N,N-dimethyl (meth)acrylamide, N-t-butyl acrylamide, octyl-acrylamide, etc.

Nonlimiting examples of alkyl di(meth)acrylates include dimethylaminoethyl di(meth)acrylate, 1,6-hexanediol diacrylate, diethyleneglycol di(meth)acrylate, triethyleneglycol di(meth)acrylate, etc.

Nonlimiting examples of ethylenically unsaturated carboxylic acids include acrylic acid, methacrylic acid, itaconic acid, β-carboxyethyl acrylate (β-CEA), and higher oligomers of acrylic acid.

(Meth)acrylic-, (meth)acrylamido-, and (meth) acrylonitrile-terminated macromers are rubber or acrylic polymers of small to medium chain length (M$_w$ from about 2,000 to 25,000) terminated with a (meth)acrylic, (meth) acrylamido, or (meth)acrylonitrile functional group. For example, Shell Chemical Co. (Houston, Tex.) manufactures a research product, HPVM-1251, which it calls a "Kraton Liquid™ polymer. HPVM-1251 is a methacrylate-functional poly(ethylene/butylene) polymer, of 4000 molecular weight, having a single methacrylate group at one end of the polymer. The preparation of (meth)acryl-terminated ethylene-propylene and ethylene/butylene macromers and their use in preparing acrylic-rubber hybrid graft copolymers are described in U.S. Pat. No. 5,625,005, which is incorporated by reference herein.

The term "non-acrylic monomer" refers to a free-radical polymerizable monomer having a vinyl or other ethylenically unsaturated group, other than acrylic monomers. Nonlimiting examples include allylic monomers, styrenic monomers (e.g., styrene, α-methyl styrene, t-butyl-styrene, 4-methoxy-styrene, 3-ethyl-styrene, 4-ethyl-styrene, and 1,4- or 1,3 divinyl-benzene), N-vinyl lactams (e.g., N-vinyl pyrrolidone), vinyl pyridine, vinyl esters (e.g., vinyl acetate, vinyl butyrate, vinyl propionate, vinyl isobutyrate, vinyl valerate, and vinyl versitate), sodium vinyl sulfonate, and dialkyl maleates and fumarates (e.g., dioctyl maleate, di-ethylhexyl fumarate, etc.).

An extended list of acrylic and non-acrylic monomers used to prepare PSAs is found in Appendix 15A of the Handbook, at pages 444–450, incorporated by reference herein and attached hereto as Appendix I.

A PSA formed of a plurality of monomers, including at least one BCBO or other ketene-forming monomer, is prepared using solvent, emulsion, hot-melt, or other free-radical polymerization, using techniques and reagents well known in the art. Nonlimiting examples are found in the following patents: U.S. Pat. Nos. 5,164,444, 5,563,205, and WO 97/11996, each of which is incorporated herein by reference. Acrylic "warm melt" polymerization (described below) can also be used.

In one aspect of the invention, high performance PSAs are prepared by curing a copolymer of at least one copolymerizing a BCBO monomer and a plurality of acrylic and/or non-acrylic monomers. The identity and amount of the monomers are selected such that the copolymer is functional as a PSA and cures to a high cohesive strength. One embodiment of this aspect of the invention is a PSA formed from at least one BCBO monomer and at least two acrylic monomers, for example, at least one alkyl acrylate and a hydroxyalkyl acrylate. Another embodiment is a PSA formed from at least one BCBO monomer, at least one acrylic monomer, and at least one non-acrylic monomer. In another embodiment, a PSA is formed from at least one BCBO monomer, at least one "soft" monomer, and at least one hydroxy-functional monomer and/or at least one ethylenically unsaturated carboxylic acid. The plurality of monomers can additionally include at least one "hard" monomer. As used herein, the term "soft monomer" refers to a monomer which, when homopolymerized, forms a polymer having a T$_g$<0° C., more preferably, T$_g$<−25° C. Nonlimiting examples include alkyl acrylates having 4 to 12 carbon atoms in the alkyl group thereof. The term "hard monomer" refers to a monomer which, when homopolymerized, forms a polymer having a T$_g$>0° C. Nonlimiting examples include vinyl esters, styrene, α-methyl styrene, methyl acrylate, methyl methacrylate, ethyl methacrylate, and amide monomers.

In any of these embodiments, a small amount of chain transfer agent can be included in the monomer mixture to control molecular weight of the copolymer. A nonlimiting example of a chain transfer agent is n-dodecyl mercaptan (n-DDM).

A more specific, non-limiting example of a PSA according to the present invention is prepared from the monomers 2-ethylhexyl acrylate (2-EHA), butyl acrylate (BA), methyl methacrylate (MMA), methacrylic acid (MAA), acrylic acid (AA), 2-hydroxyethyl acrylate (2-HEA), and BCBO acrylamide (BCBO-AM), with a small amount of DDM added as a chain transfer agent. Numerous other permutations, with fewer or more monomers, can be prepared and are included within the scope of the invention. All that is required for this aspect of the invention is that the plurality of monomers include at least one BCBO or other ketene-forming monomer and a combination of other monomers that yield a copolymer having PSA behavior (described above).

Forming a copolymer that includes both a BCBO monomer and a hydroxy-functional monomer (for example, 2-HEA, HEMA, etc.) ensures that the polymer will be susceptible to UV-crosslinking through reaction of a photolytically rearranged BCBO moiety (i.e., a ketene) and a hydroxyl group, according to Scheme 1 above. However, it has been discovered that even copolymers made from a plurality of monomers that does not include hydroxy-functional monomers also can be UV-cured to a high cohesive strength, particularly if another reactive group, such as a carboxylic acid, is present.

In another aspect of the invention, two or more distinct polymers are prepared and then crosslinked. At least one of the polymers is formed from a plurality of monomers that includes at least one BCBO or other ketene-forming monomer. A second polymer is formed from a second plurality of monomers. In some embodiments, the second plurality of monomers includes one or more hydroxy-functional monomers. In another embodiment, the second plurality of monomers includes some other functional group capable of reacting with a ketene during crosslinking. When heated or exposed to UV radiation, the two or more polymers cure to a high cohesive strength PSA or protective coating. A nonlimiting examples of this embodiment is shown in Scheme 2, with covalent crosslinks denoted by "X."

Scheme 2

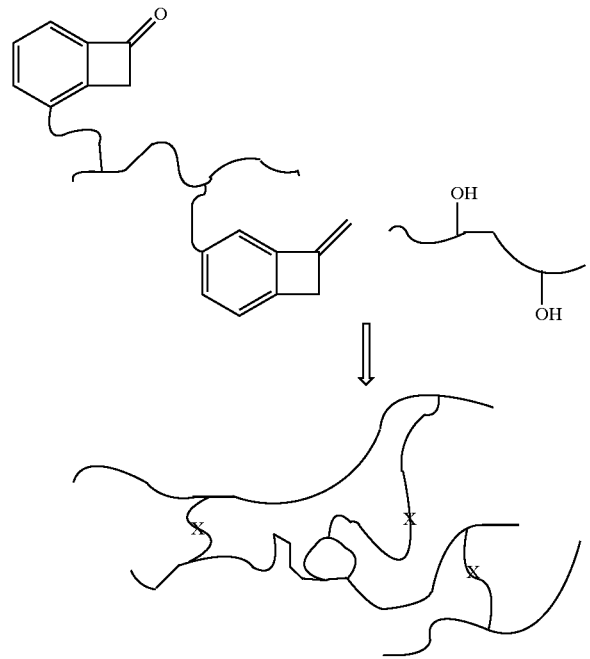

A variation on this aspect of the invention uses one or more polyhydric alcohols—for example, polyethylene glycol (PEG)—which can crosslink with one or more BCBO moieties (or other ketene-forming monomers) when cured with heat or UV light. The approach is similar to that depicted above in Scheme 2, except that PEG molecules (or other polyhydric alcohols) are the source of hydroxyl groups.

The amount of BCBO monomer employed in a given formulation depends on the degree of crosslinking that is desired, but, in general, is rather small, e.g., less than about 1% by weight (more preferably, about 0.2 to 0.5%) in the case of a PSA, and up to about 10% being used in the case of a film or protective coating. (Weight percentages are expressed based on the total weight of all monomers.) Non-BCBO monomers make up the bulk of the copolymer. In general, the more BCBO monomer(s) present in the polymer(s), the greater the degree of crosslinking that will result, with the crosslinked polymeric composition exhibiting greater cohesive strength (and resistance to shear), but also less tackiness than a less-highly crosslinked material. The identity and amount of non-BCBO monomers included in a given formulation are tailored to yield a PSA having any desired set of properties. Nonlimiting examples of such properties include shear strength, tackiness, polarity, usefulness at a particular temperature and/or humidity, adhesion to particular substrates, etc. Thus, In some embodiments, it may be preferred to include a major amount of alkyl acrylates, with a minor amount of polar monomers, hard monomers, etc. In other embodiments, one or more particular monomers may be preferred.

After one or more copolymers are prepared, a PSA construction can be made, using fabrication techniques well known in the art. The copolymer or mixture of copolymers is coated on or otherwise applied to a substrate, as a hot melt, a solution, or an emulsion. Prior to application to a substrate, the copolymer(s) can be, and preferably are, compounded with one or more fillers, pigments, thickeners, antioxidants, defoamers, tackifiers, or other additives well known in the art.

A particularly convenient mode of application is direct coating, where the copolymer(s) are directly applied to a moving web (substrate) as a thin film. When the copolymer(s) are a solution or emulsion PSA, the major portion of volatiles is removed before the coated adhesive is cured, either by air-drying or by placing it in a forced-air oven for a few minutes. The last traces of volatiles can be removed in a forced-air oven after cure.

Nonlimiting examples of conventional PSA coating methods include slot die, air knife, brush, curtain, extrusion, blade, floating knife, gravure, kiss roll, knife-over-blanket, knife-over-roll, offset gravure, reverse roll, reverse smoothing roll, rod, and squeeze roll coating. The adhesive composition can be coated on a release liner (e.g., a silicone-coated paper or film), air-or oven-dried, and then laminated to a flexible backing, i.e., a facestock. Alternatively, the adhesive can be coated directly on a facestock, dried, and then protected with a release liner. Self-wound tapes also can be prepared, e.g., by coating the adhesive on one side of a tape facestock. (The other side of the facestock is silicone-coated or otherwise treated so the tape can be wound up on itself without blocking.) The adhesive coating is applied at a desirable coat weight (conveniently measured after drying) that generally lies within the range of about 15 to 100 grams per square meter ($g/m^2$ or "gsm"). The coated adhesive can then be cured, either by heating it, or more preferably, by irradiating it with UV light or EB radiation.

UV curing may be carried out in a manner well known to those skilled in the art, using commercially available lamps, such as mercury lamps, fusion system lamps, and the like. A variety of bulbs, including D, Q, V, and H bulbs, are available, with spectral outputs covering a range of ultraviolet wavelengths. For example, a "D" bulb emits UV radiation within a spectral region of from 200 nm to 450 nm, with a relatively stronger emission in the region of 350 to 450 nm.

Coating an adhesive on a web is easier with low viscosity adhesives than it is with high viscosity adhesives. The intrinsic viscosity of polymeric materials is molecular weight-dependent, and the flow properties of low molecular weight PSA polymers are much better than those of high molecular weight PSA polymers. Unfortunately, low molecular weight PSA polymers generally have low cohesive strength, which is undesirable. Hence, the desirable features of good coatability or "flow," and high cohesive strength, are at odds with one another.

With solution or emulsion PSAs, the competing features of good flow and good shear resistance (high cohesive strength) are easily accommodated because the viscosity of an adhesive solution or an emulsion is much lower than that of the actual polymers themselves. With hot melt adhesives, however, where a 100% solids adhesive is heated to a relatively high temperature (e.g., about 90° C.) to achieve the desired flow characteristics, and no (or very little) solvent is employed, the situation is problematic. In one embodiment of the present invention, this problem is addressed by UV-curing an acrylic "warm melt" copolymer. A 100% solids PSA copolymer, having a low molecular weight (e.g., $M_n$<about 10,000) is heated slightly above room temperature (e.g., to about 30–40° C.) and applied to a substrate. Because the polymer molecular weight is so low, far less heat is required to melt the polymer and obtain good flow. The desired high cohesive strength is then obtained by curing the coated PSA copolymer with UV irradiation. UV-curing is facilitated by the presence of BCBO moieties (or other ketene-forming monomers) provided in the polymer itself. This approach allows low-energy coating processes to be used to form a cured PSA construction having a desired high cohesive strength, without the use of solvent or emulsion adhesives.

In another aspect of the invention, ketene-forming compounds (e.g., BCBO compounds) are used to form polymeric compositions that can be UV-cured to form protective coatings useful in a wide variety of applications. In one embodiment, a hydroxyl-functional perfluoropolyether (PFPE) is made to react with a BCBO derivative and forms a BCBO-functional perfluoropolyether macromer (BCBO-PFPE). The BCBO-functional macromer can then be grafted onto an acrylic polymer backbone, using heat, or more preferably, UV irradiation. The resulting graft polymer is then used to form clear films or coatings that have protective as well as self-cleaning properties.

Perfluoropolyethers are soluble in common organic solvents, curable at high temperatures, as well as room temperatures, and have increased compatibility with many materials. Their low molecular weight and relatively good chemical compatibility make them ideal for use in paints or coatings where it is desirable to reduce the amount of volatile organic compounds. They also have excellent durability and outstanding stability.

Two non-limiting examples of PFPE compounds are shown below. The first (Ia) is hydroxyl-terminated at both ends of the polymer, while the second (Ib) is hydroxyl-terminated at one end only.

HO—CH$_2$—CF$_2$—O—(CF$_2$—CF$_2$—O)$_p$—(CF$_2$—O)$_q$—CF$_2$—CH$_2$—OH  Ia

HO—CH$_2$—CF$_2$—O—(CF$_2$—CF$_2$—O)$_p$—(CF$_2$—O)$_q$—CF$_2$—CH$_2$—OR (R is —CH$_3$ or —C$_2$H$_5$)  Ib

Both compounds are liquids at 20° C. The diols (compounds having the formula Ia) are commercially available from Ausimont USA, Inc. (Orange, Tex.), under the trademark Fomblin ZDOL. These are oligomeric products consisting of a random distribution of —CF$_2$CF$_2$O— (C$_2$ unit) and —CF$_2$— (C$_1$ unit). They are characterized by $M_w/M_n$=1.2 to 2.0, p/q=0.8 to 1.2, and $M_n$=1000 to 4000. The diols are sold under the mark "Fomblin ZDOL." Monohydroxy-functional PFPEs (compounds having the formula Ib) should have similar repeat unit and molecular weight values and ratios ($M_w/M_n$, p/q, and $M_n$). Derivatives of such compounds can be synthesized according to the procedure described in "Synthesis and characterization of low-viscosity fluoroether-based segmented oligomers," Die Angewandte Makromolekulare Chemie, 231 (1995) 47–60, (Nr. 4000) S. Turri, M. Scicchitano, and C. Tonelli, incorporated by reference herein.

The reactive hydroxyl end-groups on these compounds can react with a BCBO compound, such as an acid-functional compound (II), according to Scheme 3:

Scheme 3

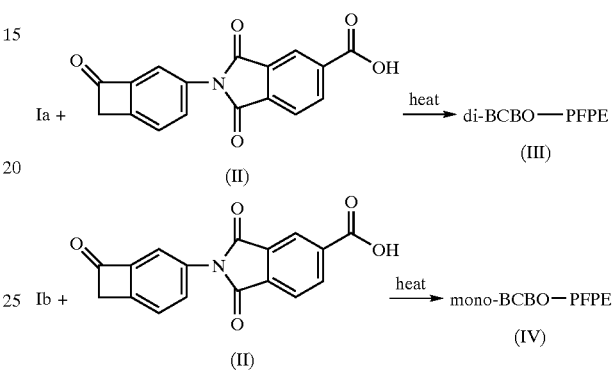

The synthesis of the acid-functional BCBO compound (II) is described in Example 6 of U.S. Pat. No. 5,869,693.

The BCBO-end-capped PFPE macromers (III) and (IV) can be reacted with an acrylic copolymer, using UV irradiation, to form a graft polymer in which PFPE sidechains are grafted onto an acrylic polymer backbone. Standard coating techniques can be used to make a coating or film from a solution of the graft polymer. In some embodiments, compound (III) can be post-added into the irradiated solution. Further UV-curing can be performed just before the coated solution is subjected to heating. In this way, compound (III) is capable of introducing crosslinking into the coating system.

The following, non-limiting examples are provided to illustrate the invention and its preparation.

EXAMPLE 1
BCBO Methacrylate
5-Hydroxybenzocyclobutenone (5-hydroxy BCBO), synthesized according to Example 17 of U.S. Pat. No. 5,869,693, is dissolved in an organic solvent in the presence of dry pyridine, and methacryloyl chloride is added dropwise at 25° C. The molar ratio of methacryloyl chloride to 5-hydroxy-BCBO is 1:1. The reaction proceeds at 25° C. for thirty minutes.

EXAMPLE 2
BCBO-Acrylate
The procedure of Example 1 is repeated, but acryloyl chloride is used instead of methacryloyl chloride. The molar ratio of reactants is 1:1.

Control 1—An Emulsion Acrylic Copolymer
An emulsion adhesive containing no BCBO functional groups was prepared by emulsion polymerization from a plurality of monomers consisting of 65.11% 2-EHA, 14.92% BA, 14.92% MMA, 1.76% MAA, 2.47% AA, and 0.54% 2-HEA, based on the weight of all monomers, with 0.27% by weight of n-DDM added as a chain transfer agent. A 1-liter, jacketed, cylindrical reaction flask equipped with a four-neck flask head was fitted with a steel stirring rod with multiple steel blades, a reflux condenser, a thermometer, and a nitrogen inlet tube. The stirring speed was set at ca.125 rpm, and the reaction temperature was set at 80° C.

A reactor pre-charged solution was made by dissolving 1.2 g of Disponil FES-32 (32% solids, manufactured by Henkel) surfactant in 100 g deionized (DI) water.

A pre-emulsion feed soap solution was formed by dissolving 0.39 g Aerosol OT75 (75% solids), 5.53 g Igepal CO-887 (70% solids), 2.31 g Disponil FES-32 and 105 g DI water.

A monomer mix was made up with 240 g 2-ethylhexyl acrylate, 55 g of n-butyl acrylate, 55 g of methyl methacrylate, 6.5 g of methacrylic acid, 9.1 g of acrylic acid, 2.0 g of 2-hydroxyl ethyl acrylate, and 1 g of n-dodecyl mercaptan. The monomer mix was added to the pre-emulsion solution under stirring for 10 min.

An initiator solution A was prepared by dissolving 0.74 g FES-32, 1.79 g Igepal CO-887 and 0.5 g potassium persulfate (KPS) in 67 g of DI water; solution B was made by dissolving 0.5 g of KPS in 67 g of DI water. A kickoff initiator solution was prepared by dissolving 0.75 g of KPS in 38 g of water.

The reactor pre-charged solution was introduced to the glass reactor, which was flushed with nitrogen. The kickoff initiator solution was added when the solution temperature reached 80° C. After 5 min, 20 g of the pre-emulsion solution was introduced into the reactor. Upon observing polymerization, the pre-emulsion solution and initiator solution A feeds were started. Initiator solution B was fed at the end of solution A. The pre-emulsion solution feed was completed in 3 hr period, and the initiator solution A and B feeds were completed in 3 hr and 15 min. Polymerization continued for another 30 min after completion of the initiator solution B feed. The polymerization temperature was maintained at 80° C. during the polymerization. Polymerization of the monomer mixture yielded a polymer latex, which can be coated on a substrate.

EXAMPLE 3

BCBO-Containing Emulsion Polymer

The procedure used to prepare Control 1 is repeated, but BCBO acrylamide (BCBO-AM) is included in the monomer mixture. The monomers and chain transfer agents are 2-EHA/BA/MMA/MAA/AA/2HEA/BCBO-AM/n-DDM and their respective weight percentages are 64.77/14.84/14.84/1.76/2.45/0.54/0.54/0.27.

Table 1 provides volume average diameter of latex (Dv), molecular weight ($M_w$), and gel content for Control 1 and Example 3. Gel content was measured by placing an amount of dry adhesive in a 10 micron polytetrafluoroethylene membrane filter. The edges of the membrane were sealed to contain the sample, and the filter was placed in a 20 ml vial containing tetrahydrofuran. The vial was tumbled for 24 hr., and the filter was taken out and dried at elevated temperature under vacuum. The filter was weighed and the percent insolubles (gel content) was calculated by the formula $$\% \text{ Insolubles} = \frac{W_f}{W_i} \times 100$$

where $W_f$=final weight of sample, and $W_i$=initial weight of sample.

TABLE 1

Polymer Characteristics

| Example No. | Dv (nm) | Mw | Mn | Mw/Mn | Gel Content (%) |
|---|---|---|---|---|---|
| Control 1 | 179.2 | 145,000 | 37,100 | 3.91 | 0.9 |
| Example 3 | 193.8 | 143,000 | 38,000 | 3.76 | 1.0 |

Adhesive contructions were prepared and evaluated for 180° peel adhesion, loop tack, and shear resistance, using the following tet methods:

Peel Adhesion

The adhesive was coated at an approximate coat weight of 22 g/m² (dry weight) onto a 2 mil Mylar facestock, and then laminated to a silicone-coated release liner, forming a laminate construction. The resulting construction was die-cut into 25×204 mm (1×8 in) sized strips. The strips were then applied centered along the lengthwise direction to 50×152 mm (2×6 in) brightly annealed, highly polished stainless steel test panels and rolled down using a 2 kg (4.5 lb.), 5.45 pli 65 shore "A" rubber-faced roller, rolling back and forth once, at a rate of 30 cm/min (12 in/min). The samples were conditioned for either 15 min. or 24 hours in a controlled environment testing room maintained at 23° C. (73° F.) and 50% relative humidity. After conditioning, the test strips were peeled away from the test panel in an Instron Universal Tester according to a modified version of the standard tape method Pressure-Sensitive Tape Council, PSTC-1 (rev. 1992), Peel Adhesion for Single Coated Tapes 180° Angle, where the peel angle was either 180° or 90°, i.e., perpendicular to the surface of the panel, at a rate of 30 cm/min (12 in/min). The force to remove the adhesive test strip from the test panel was measured in lbs/in. Glass panels and high density polyethylene panels were also used to measure peel adhesion. All tests were conducted in triplicate.

Loop Tack

Loop tack measurements were made for samples cut to 25×204 mm (1×8 in) sized strips, using stainless steel or glass as the test panel, and a withdraw rate of about 305 mm/min (12 in/min), according to standard test 1994 TLMI Test L-IB2, TLMI Loop Tack Test, by the Tag and Label Manufacturers Institute Inc. (TLMI), using an Instron Universal Tester Tester Model 4501 from Instron (Canton, Mass.). Loop tack values were taken to be the highest measured adhesion value observed during the test. All tests were conducted in triplicate.

Room Temperature Shear (RTS)

In static shear testing, the samples were cut into 12×51 mm (½×2 in) test strips. The test strips were applied to brightly annealed, highly polished stainless steel test panels, where the typical size of the test panels was 50×75 mm (2×3 in), making a sample overlap of 12×12 mm (½×½ in) with the test panel. The sample portion on the test panel was rolled down using a 2 kg (4.5 lb.), 5.45 pli 65 shore "A" rubber-faced roller, rolling back and forth once, at a rate of 30 cm/min (12 in/min). After a dwell time of at least 15 minutes under standard laboratory testing conditions, the test panels with the test strips on them were then placed at an angle 2° from the vertical, and a load of 500 g was attached to the end of the test strips. The time in minutes for the sample to fail cohesively was measured by a timer. In the tables, the plus sign after the shear values indicate that the samples were removed after that time and that the test was discontinued. All tests were conducted in triplicate.

Failure Modes

The following adhesive failure modes were observed for some samples: "panel failure" (p)—the adhesive construction detached from the panel cleanly, without leaving a residue; "panel staining" (ps), —the adhesive construction detached cleanly, but left a faint stain or "shadow" on the panel; "high panel staining (hps)—the adhesive construction left a markedly noticeable stain on the panel; "cohesive failure"(c) —the adhesive construction split apart, leaving adhesive residue on the test panel and the facestock; "facestock failure"(fs)—the adhesive completely detached from the facestock, and transferred to the test panel; "zippy" (z) —the adhesive construction detached from the panel with a slip-stick, jerky release; and "mixed"—mixed failure modes.

The latex emulsions of Control 1 and Example 3 were neutralized with $NH_3H_2O$ to pH 8, and then directly coated on a biaxially oriented polypropylene (BOPP) facestock. Samples were dried in an oven at 200° F. for ten minutes. Some samples were left uncured, while others were post-crosslinked by UV radiation using a D bulb. For curing at a line speed of 71.5 feet/min, the radiation dose was 309 $mj/cm^2$, with one pass. All adhesion tests were performed on stainless steel panels, after a 15 minute dwell time. Table 2 provides 1800 peel and loop tack data for Control 1 and Example 3, before and after UV curing.

TABLE 2

180° Peel and Loop Tack of Control 1 and Example 3

| Example | Dose (mj/cm²) | 180° Peel (lb/in) | Std. | Loop Tack (lb/in) | Std. | Failure Mode* |
|---|---|---|---|---|---|---|
| Control 1 | 0 | 5.035 | 0.130 | 3.548 | 0.542 | P |
| " | 2 × 300 | 2.186 | 0.10 | 3.221 | 0.337 | P |
| " | 3 × 300 | 4.255 | — | 3.029 | 0.181 | P |
| Example 3 | 0 | 2.935 | 0.215 | 3.523 | 0.300 | P |
| " | 2 × 309 | 4.659 | 0.165 | 3.211 | 0.144 | P |
| " | 3 × 309 | 1.853 | 0.101 | — | — | P |

*P: Panel Failure

As indicated in Table 2, both the Control 1 and Example 3 adhesive laminates had high peel and loop tack values prior to UV curing. When the radiation dose was increased from 0 to ca.3×300 $mj/cm^2$, a slight drop in 180° peel for Control 1 was observed; for Example 3, the adhesive peel force reached a maximum at the dose rate of ca.600 $mj/cm^2$. Further exposure to UV radiation reduced the peel force. The loop tack values for both samples showed no significant change at different curing levels.

TABLE 3

Shear Test Data for Control 1 and Example 3

| Example | Dose (mj/cm²) | Static Shear (min) 0.5 Kg (min) | Std. | 1 kg (min) | Std. | Failure Mode* |
|---|---|---|---|---|---|---|
| Control 1 | 0 | 7.3 | 0.2 | — | — | C |
| " | 2 × 300 | 7.8 | 53 | — | — | C |
| " | 3 × 300 | 7.7 | 0.4 | — | — | C |
| Example 3 | 0 | 11.3 | 2.4 | — | — | C |
| " | 2 × 309 | 28000 | — | 2952 | 603 | C |
| " | 3 × 309 | 28000 | — | 5294 | 659 | C |

*C: Cohesive Failure

Both the Control and Example 3 showed low static shear, due to their low gel content (see Table 1). Without UV irradiation, the samples have comparable shear values of 7.3 min. and 11.3 min., respectively. For Control 1, no increase in shear strength was observed with an increase in curing intensity. However, Example 3 exhibited a dramatic gain in the shear strength when the UV dose was changed from 0 to ca.900 $mj/cm^2$. With a curing energy of 618 $mj/cm^2$, the static shear for a 500 gram load was greater than 19 days. By increasing the load to 1 kg, the shear strength was 2,952 minutes for the sample cured with 2×309 $mg/cm^2$ and 5,294 min. for the sample cured with 3×309 $mj/cm^2$.

EXAMPLE 4A

BCBO-Containing Solution Polymer

Using a mixture of monomers comprising 93.2% by weight 2-EHA, 5.83% AA, and 0.97% BCBO-acrylate, an acrylic copolymer was prepared by solution polymerization in ethyl acetate, using 0.3% by weight (based on the weight of monomers) of AIBN as an initiator. The reaction was carried out in a glass bottle (which had been purged with $N_2$ for ten minutes) heated to 75° C. in a water bath, over four hours.

EXAMPLE 4B

OH-Containing Polymer

Using the procedure described above in Example 4A, a monomer mixture of 92.7% by weight 2-EHA, 59.2% AA, and 1.36% 2-HEA was polymerized in ethyl acetate, at 70° C. over ten hours. 0.1% of AIBN was used as an initiator.

EXAMPLES 5–7

Uncured and UV-cured Polymer Blends

EXAMPLE 5

A small amount of Examples 4A and 4B was mixed in a glass bottle and then coated on a PET substrate, dried in air over night, and further dried in an oven at 150° F. for 20 minutes. The dried sample was divided into two parts, placed in separate bottles, and methyl ethyl ketone (MEK) was added as a diluent and to demonstrate gel formation. One sample was not irradiated. The other sample was irradiated under black light (Blak-Ray lamp, 115V, 60 Hz 0.16 amps) in the presence of air. The unirradiated sample was soluble in ethyl acetate, and the irradiated sample was in a gel form.

EXAMPLE 6

Examples 4A and 4B were mixed at a 1:1 weight ratio, coated on a PET liner, and dried in an oven at 150° F. for 15 minutes. Three adhesives from this polymer mixture were evaluated. Static shear testing (½"×½" overlap, 1 Kg weight) indicated that the unirradiated sample failed after ca.1.5 min., while the samples that were UV cured for one and two minutes, respectively, had failure times of 50 min and 46 min. Curing conditions were Blak-ray lamp, long wave UV (366 nm, 115V, 60 Hz, 0.16 amps). The one minute and two minute curing doses were 234.3 and 513 $mg/cm^2$, respectively.

EXAMPLE 7

20.16 grams of polymer 4A and 4B were placed in a glass bottle, and five grams of ethyl acetate was added. The polymer mixture was coated on a PET liner and dried in an oven at 150° F. for 15 minutes. Adhesive samples were cured with UV radiation, and shear tests (½"×½", 500 gram weight) were conducted. The results indicated that the sample with no UV curing had a failure time of 1.7 minutes, while samples cured at doses of 600 $mj/cm^2$ and 2×600 $mj/cm^2$ had failure times of 1652 min. and CA.1408 min., respectively. Cure was carried out using a "D" bulb; the line speed was 80 feet/min.

TABLE 4

Adhesive Performance of Example 7
Adhesive coating weight: 20 g/m²

| Sample | Dose (mj/cm²) | 180° Peel (N/m) | Failure Mode | Loop Tack (N/m) | Failure Mode |
|---|---|---|---|---|---|
| Uncured | 0 | 506.7 | C | 751.3 | C |
| Cured | 600 | 475.0 | P | 542.3 | P |

*C: Cohesive failure;
P: Panel failure

EXAMPLES 8A to 10B

Using the solution polymerization technique described above, a series of hydroxyl-containing and BCBO-containing acrylic polymers were prepared, mixed together, coated on a substrate, and UV-cured. The identity and amounts of monomers (expressed on a mole/mole basis), polymer characteristics, and % solids are presented in Table 5. Examples 9A, 9B, and 9C used different amounts of Vazo 64 (an azobisisobutyronitrile (AIBN) initiator) (1%, 1.5%, and 3%, respectively, expressed on a percent by weight basis, based the weight of all monomers.

TABLE 5

OH— and BCBO-Containing Acrylic
Polymers by Solution Polymerization

| Example | Monomers (mol/mol) | Mw | Mn | Mw/Mn | Sol (%) |
|---|---|---|---|---|---|
| 8A | 2EHA/AA/2HEA (90/8/2) | 45.6K | 8.52K | 5.35 | 20 |
| 8B | 2EHA/AA/BCBO-AM (90/8/2) | 50.7K | 9.05K | 5.61 | 20 |
| 9A | 2HEA/AA/2HEA (90/8/2) | 117K | 14.4K | 8.14 | 30 |
| 9B | 2HEA/AA/2HEA (90/8/2 | 183K | 14.9K | 12.3 | 30 |
| 9C | 2HEA/AA/2HEA (90/8/2) | 187K | 12.1K | 15.5 | 30 |
| 10A | 2EHA/AA/2HEA (90/8/2) | 101.5K | 13.1K | 7.75 | 30 |
| 10B | 2EHA/AA/BCBO-AM (90/8/2) | 82.5K | 12.4K | 6.68 | 30 |

EXAMPLE 11

A 1:1 weight ratio mixture of Example 8A and 8B was coated on a 2 mil BOPP film substrate at 19 grams per square meter (gsm) (dry weight), and the coated substrate was divided into samples, one of which was left unirradiated. The other samples were irradiated at 300 mj/cm² in 1, 2, 3, or 4 passes, denoted 1×300, 2×300, 3×300, and 4×300, respectively. 180° peel, loop tack, and shear (500 g weight) data for the samples are presented in Table 6.

TABLE 6

Adhesive Performance of Example 11

| Sample ID | Dose (mj/cm²) | 180° Peel (N/m) | Loop Tack (N/m) | Shear (min) |
|---|---|---|---|---|
| A | 0 | N/A | — | N/A |
| B | 1 × 300 | 121.3 | 291.2 | 34 |
| C | 2 × 300 | 116.1 | 234.2 | 49 |
| D | 3 × 300 | 118.5 | 237.3 | 63 |
| E | 4 × 300 | 116.9 | 204.3 | 91 |

EXAMPLE 12

Examples 10A and 10B were mixed together, and several samples were prepared by coating the mixture on a substrate at either 14 or 28.8 gsm. One sample at each coat weight was left unirradiated, and other samples from each of the different coat weights was irradiated in 1, 2, 3, or 4 passes. Peel, shear (0.5 kg weight) and tack data are presented in Table 7.

TABLE 7

Adhesive Performance of Example 12

| Sample ID | Dose (mj/cm²) | Ct Wt. (gsm) | 180° Peel (N/m) | Loop Tack (N/m) | Shear (min) |
|---|---|---|---|---|---|
| A | 0 | 14 | — | — | N/A |
| B | 1 × 300 | 14 | 27.5 | 148.3 | — |
| C | 2 × 300 | 14 | 23.7 | 129.8 | — |
| D | 3 × 300 | 14 | 24.6 | 156 | — |
| E | 4 × 300 | 14 | 21.3 | 114.2 | — |
| F | 0 | 28.8 | — | — | N/A |
| G | 1 × 300 | 28.8 | 103.4 | 260.3 | 61 |
| H | 2 × 300 | 28.8 | 67.5 | 216.8 | 82.3 |
| I | 3 × 300 | 28.8 | 58.4 | 244 | 134.7 |
| J | 4 × 300 | 28.8 | 51.3 | 179.5 | 4000+ |

EXAMPLE 13

A UV-cured, transfer-coated adhesive was prepared as follows:

(1) Polymer Synthesis

A) 19.17 g of 2EHA, 1.87 g of AA, 5.85 g of methyl acrylate, and 0.23 g of 2HEA were mixed in 40.69 g of ethyl acetate. The mixture was placed in a glass bottle reactor. After adding 0.678 g of Vazo 64 initiator, the mixture was purged with nitrogen for 5 min. The sealed reactor was then put into an oil bath, and the reaction temperature was set at 70° C. Polymerization proceeded for 16 hours.

B) A BCBO-containing polymer was synthesized in the same manner as described in A), except that 1.87 g of BCBO acrylamide monomer was used instead of 2-HEA.

(2) Transfer-Coated Adhesive Preparation

A mixture of A and B at a 1/1 ratio was prepared and coated on a 2 mil PET release liner. The coated polymer solution was dried in an oven at 150° F. for 10 min, and the dried adhesive was then exposed to UV irradiation. The cured adhesive was laminated to a BOPP facestock, which allowed the adhesive to be transferred from the release liner to the facestock. The coat weight of adhesive (dry weight) was 40 gsm. Adhesive performance data is presented in Table 8.

TABLE 8

Adhesive Performance of Example 13

| Sample ID | Dose (mj/cm²) | 180° peel (lb/in) | Loop tack (lb/in) | Static shear @ 0.5 kg (min) | Failure Mode* For loop tack | For shear |
|---|---|---|---|---|---|---|
| A/B | 0 | — | — | <1 | — | C |
| A/B | 900 | 5.7 | 4.97 | 230 | P | C |

*P: Panel failure;
C: Cohesive failure

EXAMPLE 14

Hydroxyl-Free, BCBO-Containing Copolymer

A monomer mixture of 2-EHA (19.17 g), AA (1.87 g), and MA (5.85 g) was added into ethyl acetate solvent (40.69 g) in a glass bottle reactor, followed by BCBO-AM (1.87 g) monomer, and Vazo 64 (0.678 g) initiator. The mixture was purged with $N_2$ for 5 min. The sealed reactor was placed in an oil bath and heated at 75° C. for 16 hours to polymerize the monomer mixture. Adhesive samples were prepared and cured as described in previous examples. Table 9 presents 180° peel, loop tack, and static shear resistance data for the coated adhesive. Only Sample B was irradiated.

TABLE 9

Adhesive Performance of Example 14

| Sample ID | Dose (mj/cm$^2$) | 180° peel (lb/in) | Loop tack (lb/in) | Static shear @ 0.5 kg (min) | Failure Mode* | |
|---|---|---|---|---|---|---|
| | | | | | For loop tack | For shear |
| A | 0 | — | — | <1 | — | C |
| B | 900 | 4.1 | 3.98 | 520 | P | C |

*P: adherent failure;
C: cohesive failure

Control 2—Hydroxyl-Free Acrylic Copolymer

A monomer mix was prepared by mixing 2-EHA (216.7 g), MA (56.68 g), AA (22.05 g), and NVP (22.19 g) in a glass container. 75 g of the monomer mix was charged into a jacketed reactor containing a solvent mixture of ethyl acetate (30.00 g), methanol (5.00 g), acetone (23.40 g), and n-heptane (20.00 g). The reactor was heated to reflux, and an initiator solution containing Vazo 64 (0.12 g) and ethyl acetate (5.00 g) was added to the reactor. After 5 min., a monomer feed containing the monomer mix (243.66 g), ethyl acetate (25.28 g), n-heptane (36.00 g), methanol (33.52 g) and Vazo 64 (0.35 g) was pumped into the reactor at a rate of 2.8 g/min. After the monomer feed was complete, polymerization was continued for 2 hours, and the reactor was then cooled. The obtained polymer solution was adjusted to 30.4% solids content, and had a viscosity of 1400 cps at 25° C.

EXAMPLE 15

A copolymer of 2-EHA, MA, AA, and NVP was synthesized in a manner as described above in Control 2, except the monomer mix also contained BCBO-AM (1.039 g).

As in previous examples, Control 2 and Example 15 were coated on a BOPP facestock, dried in an oven for 10 min. at 150° F., and the resulting constructions were irradiated with UV light (600 mj/cm$^2$). Example 15, which was prepared with BCBO-AM monomer, cured to a high cohesive strength (>5600 min. static shear resistance) even though hydroxyl-containing monomers were not included in the monomer mix. Static shear test results for Control 2 and Example 15 are presented in Table 10.

TABLE 10

Adhesive Performance of Example 15

| Sample ID | Dose (mj/cm$^2$) | Static Shear ½ × ½" @ 1 Kg (min) | Failure Mode* |
|---|---|---|---|
| Control 2 | 600 | 126 | C |
| Example 15 | 600 | >5600 | N/A |

*C: Cohesive failure

EXAMPLE 16
A Rubber/Acrylate Hybrid Graft Copolymer

A hybrid polymer was made by grafting Shell Kraton liquid polymer L-1302 onto a BCBO-containing acrylic polymer backbone. The BCBO-containing polymer was synthesized by solution polymerization as follows: 2-EHA (48 g), AA (3 g), and BCBO-AM (0.5 g) were mixed with ethyl acetate (98.5 g) in the presence of Vazo 64 initiator (0.15 g). Polymerization was carried out in a sealed glass bottle in a heated water bath, at 75° C., for 4 hours. The obtained polymer solution was then thickened to a solids content of about 50% (solution A). Separately, toluene (10 g) was used to dissolve L-1302 Kraton liquid polymer (10 g), in a glass container (solution B). Solution A (5 g) was added to a small glass bottle, to which solution B (0.5 g) was added. The mixture was stirred, and appeared translucent. Toluene (2.9 g) and cyclohexane (1 g) were mixed and added to the bottle to obtain a clear solution.

Film A: 2 g of the clear solution described above was spread on a silicone-coated paper release liner, and the coated liner was air dried for four hours at ambient temperature, and then further dried by hot air.

Film B: 2 g of the clear solution was spread on a silicone-coated paper release liner, and the coated liner was then UV irradiated under a black-ray lamp (UV-366 nm, 115 v, 60 Hz, 0.16 amps) for 10 min. The UV-irradiated sample underwent the same drying process as described for Film A. Optical micrography revealed a different morphology for Films A and B. Specifically, the micrograph for Film A indicated the existence of oil droplet-like materials in the polymer continuous phase. However, such droplets appeared in a much smaller size in Film B, which is believed to be due to the higher compatibility between L-1302 and acrylic polymers resulting from the grafting. Gel permeation chromatography (GPC) analysis showed a new species with a higher molecular weight in Film B as compared with Film A. The higher molecular weight portion is believed to stem from the grafting reaction of L-1302 and BCBO units on the acrylic polymers.

EXAMPLE 17
Alkyl Acrylate—BCBO Copolymer

An acrylic polymer containing neither —OH groups nor —COOH groups was prepared, crosslinked, and evaluated for cohesive strength. The monomers 2-EHA (33.17 g) and BCBO-AM (0.748 g) were weighed and placed in a glass bottle, to which ethyl acetate (80 g) was added. Vazo 64 (0.35 g) was used as an initiator, and it was added into the solution in the bottle. The mixture was stirred and purged with $N_2$ for 5 minutes before it was sealed. The sealed glass bottle was then placed into a shaker in an oil both at 75° C. to start polymerization. The reaction proceeded for 16 hours.

The obtained polymer solution was thickened up to a 50% solids level, and a coated on BOPP facestock, then dried in an oven for 10 minutes at 150° F. The dried adhesive polymer film had a low cohesive strength, due to its low molecular weight. Static shear test showed that the 500 g shear resistance was less than 2 seconds. However, the same adhesive after UV cure (dose:590 mj/cm$^2$) had a shear resistance of 48 min, with a panel failure mode of failure.

EXAMPLE 18
Fluroropolymer Protective Coating

An acrylic copolymer of ethyl methacrylate (EMA) and 2-hydroxyethyl acrylate (HEA) (or 2-hydroxyethyl methacrylate (HEMA)) is prepared by mixing EMA and HEA or HEMA) at a weight ratio of 80/20, charging a glass reactor with the monomer mixture, 1% by weight (based on the weight of monomers) of Vazo 64 initiator, and ethyl acetate (solvent). Polymerization proceeds as described in previous examples. The resulting polymer and a mono- or di-BCBO-functional PFPE macromer (e.g., compound (IV) or (III), generally described above) are dissolved in an organic solvent, and the mixture is UV irradiated. Using conventional coating techniques, the resulting graft polymer is made into a film or protective coating. In one variation, compound (III) is post-added to the graft polymer solution, which is then coated on a substrate and heated or irradiated to cure the composition further.

The invention has been described and illustrated by exemplary and preferred embodiments, but is not limited thereto. Persons skilled in the art will appreciate that variety of modifications can be made without departing from the scope of the invention, which is limited only by the claims. Throughout the text and the claims, use of the word "about" in relation to a range of numbers is intended to modify both the low and the high values stated.

What is claimed is:

1. A benzocyclobutenone (BCBO)-functional fluoropolymer.

2. A BCBO-functional fluoropolymer as recited in claim 1, comprising the reaction product of a BCBO compound and a hydroxyfuntional perfluoropolyether (PFPE).

3. A BCBO-functional fluoropolymer as recited in claim 2, wherein the BCBO compound has the formula

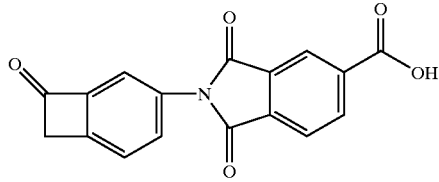

4. A BCBO-functional fluoropolymer as recited in claim 2, wherein the hydroxy-functional PFPE has (a) an $M_n$ of 1,000 to 4,000, and (b) the formula

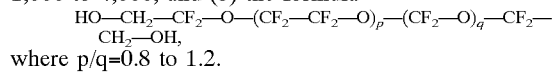

where p/q=0.8 to 1.2.

5. A BCBO-functional fluoropolymer as recited in claim 2, wherein the hydroxy-functional PFPE has (a) an $M_n$ of 1,000 to 4,000, and (b) the formula

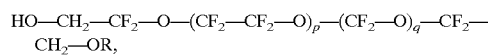

where R is $CH_3$ or $C_2H_5$ and p/q=0.8 to 1.2.

6. A polymer comprising the reaction product of a BCBO-end-capped PFPE macromer and an acrylic copolymer.

7. A polymer as recited in claim 6, wherein the acrylic copolymer comprises a copolymer of ethyl methacrylate and hydroxyethyl acrylate.

8. A polymer as recited in claim 6, wherein the acrylic copolymer comprises a copolymer of ethyl methacrylate and hydroxyethyl methacrylate.

9. A polymeric composition comprising a BCBO-functional fluoropolymer.

10. A polymeric composition as recited in claim 9, wherein the BCBO-functional fluoropolymer is a perfluoropolyether (PFPE).

11. A polymeric composition as recited in claim 9, wherein the BCBO-functional fluoropolymer is a mono-BCBO-PFPE.

12. A polymeric composition as recited in claim 9, wherein the BCBO-functional fluoropolymer is a di-BCBO-PFPE.

13. A polymer or polymeric composition as recited in any one of preceding claims, in which said polymer or polymeric composition one is crosslinked.

* * * * *

UNITED STATES PATENT AND TRADEMARK OFFICE
CERTIFICATE OF CORRECTION

PATENT NO. : 6,884,848 B2 Page 1 of 1
DATED : April 26, 2005
INVENTOR(S) : Li et al.

It is certified that error appears in the above-identified patent and that said Letters Patent is hereby corrected as shown below:

<u>Column 20,</u>
Line 29, after "one of", insert -- the --.
Line 30, delete "one".

Signed and Sealed this

Twenty-seventh Day of December, 2005

JON W. DUDAS
*Director of the United States Patent and Trademark Office*